(12) United States Patent
Park

(10) Patent No.: US 10,355,845 B2
(45) Date of Patent: *Jul. 16, 2019

(54) METHOD AND APPARATUS FOR TRANSMITTING HARQ ACK/NACK

(71) Applicants: SK TELECOM CO., LTD., Seoul (KR); INNOSKY, Seoul (KR)

(72) Inventor: Dong Hyun Park, Seoul (KR)

(73) Assignees: SK TELECOM CO., LTD., Seoul (KR); INNOSKY, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/149,381

(22) Filed: Oct. 2, 2018

(65) Prior Publication Data

US 2019/0036669 A1 Jan. 31, 2019

Related U.S. Application Data

(63) Continuation of application No. 15/839,079, filed on Dec. 12, 2017, now Pat. No. 10,122,514, which is a
(Continued)

(30) Foreign Application Priority Data

Jan. 29, 2014 (KR) .................. 10-2014-0011415

(51) Int. Cl.
*H04W 28/00* (2009.01)
*H04L 5/00* (2006.01)
(Continued)

(52) U.S. Cl.
CPC .......... *H04L 5/0055* (2013.01); *H04L 1/1854* (2013.01); *H04L 5/001* (2013.01); *H04L 5/1469* (2013.01); *H04W 28/00* (2013.01)

(58) Field of Classification Search
USPC ....................................... 370/280
See application file for complete search history.

(56) References Cited

U.S. PATENT DOCUMENTS 9,853,795 B2   12/2017  Park
2012/0294204 A1  11/2012  Chen et al.
(Continued)

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.4.0, Sep. 2013, pp. 1-182, 3GPP Organizational Partners.
(Continued)

*Primary Examiner* — Angel T Brockman
(74) *Attorney, Agent, or Firm* — Paratus Law Group, PLLC

(57) ABSTRACT

Provided is a method and apparatus for transmitting an HARQ ACK/NACK. The method includes: recognizing, from a PDCCH or an EPDCCH, a 2-bit uplink (UL) downlink assignment index (DAI) field configured in a UL downlink control information (DCI) format; receiving a PDSCH transmission through the second serving cell; generating an HARQ response signal based on the number of PDSCHs scheduled in the downlink subframes indicated by the UL DAI field and the number of total downlink subframes associated with one uplink subframe; and transmitting the HARQ response signal through a PUSCH in the one uplink subframe.

11 Claims, 12 Drawing Sheets

Related U.S. Application Data continuation of application No. 14/608,124, filed on Jan. 28, 2015, now Pat. No. 9,853,795.

(51) Int. Cl.
*H04L 1/18* (2006.01)
*H04L 5/14* (2006.01)

(56) References Cited

U.S. PATENT DOCUMENTS

| | | |
|---|---|---|
| 2013/0286907 A1 | 10/2013 | Wei et al. |
| 2013/0343239 A1 | 12/2013 | Damnjanovic et al. |
| 2014/0334440 A1* | 11/2014 | Wong ............ H04W 36/0011 370/331 |
| 2015/0023229 A1 | 1/2015 | Yin et al. |

OTHER PUBLICATIONS

"Scheduling/HARQ design for TDD-FDD CA other than PUCCH for UL-CA", 3GPP TSG RAN WG1 #75, Nov. 11-15, 2013, pp. 1-9, R1-135512, NTT DOCOMO, San Francisco, USA.

"Consideration on HARQ-ACK and DCI for TDD-FDD CA", 3GPP TSG RAN WG1 #75, Nov. 11-15, 2013, pp. 1-9, R1-135464, LG Electronics, San Francisco, USA.

"Downlink HARQ timing in TDD-FDD carrier aggregation", 3GPP TSG RAN WG1 #75, Nov. 11-15, 2013, pp. 1-7, R1-135275, ETRI, San Francisco, USA.

"UCI transmission for FDD-TDD carrier aggregation", 3GPP TSG RAN WG1 #75, Nov. 11-15, 2013, pp. 1-5, R1-135074, CATT, San Francisco, USA.

International Search Report for International Patent Application No. PCT/KR2015/000944, dated Apr. 28, 2015.

Written Opinion for International Patent Application No. PCT/KR2015/000944, dated Apr. 28, 2015.

\* cited by examiner

FIG. 7
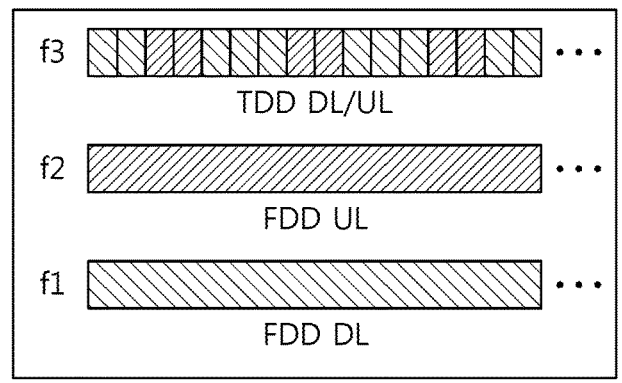
(a) CA of TDD & FDD
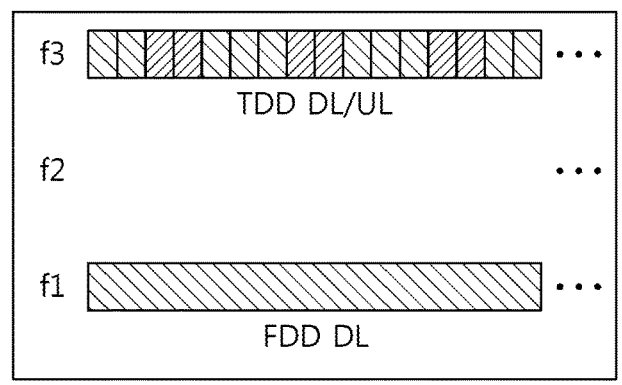
(b) CA of TDD & FDD DL
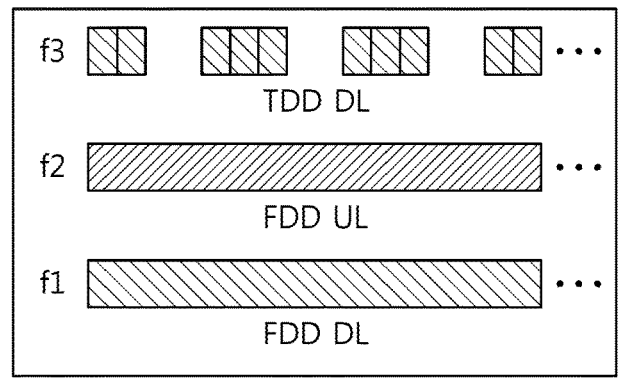
(c) CA of TDD DL & FDD

FIG. 8

| | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Pcell(TDD #1) | D | S | U | U | D | D | S | U | U | D | D | S | U | U | D | D | S | U | U | D |
| Scell(FDD) | ⊠ | ⊠ | ⊠ | D | D | ⊠ | ⊠ | ⊠ | D | D | ⊠ | ⊠ | ⊠ | D | D | ⊠ | ⊠ | ⊠ | D | D |
| | U | U | U | U | U | U | U | U | U | U | U | U | U | U | U | U | U | U | U | U |

FIG. 9

| 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|
| D | S | U | U | D | D | S | U | U | D | D | S | U | U | D | D | S | U | U | D |
|   |   |   |   |   |   |   |   |   |   |   |   |   |   |   |   |   |   |   |   |
| ⊠ | ⊠ | ⊠ | ⊠ | D | ⊠ | ⊠ | ⊠ | D | D | ⊠ | ⊠ | ⊠ | ⊠ | D | ⊠ | ⊠ | ⊠ | D | D |
| U | U | U | U | U | U | U | U | U | U | U | U | U | U | U | U | U | U | U | U |

Pcell(TDD #1)

Scell(FDD)

METHOD AND APPARATUS FOR TRANSMITTING HARQ ACK/NACK

CROSS-REFERENCE TO PRIOR APPLICATIONS

This application is a Continuation of U.S. patent application Ser. No. 15/839,079, filed on Dec. 12, 2017, which is a Continuation of U.S. patent application Ser. No. 14/608,124, filed on Jan. 28, 2015 and issued as U.S. Pat. No. 9,853,795 on Dec. 26, 2017, which claims priority to Korean Patent Application No. 10-2014-0011415, filed on Jan. 29, 2014, which are all hereby incorporated by reference in their entirety.

BACKGROUND

1. Field

The present disclosure relates to wireless communication, and more particularly, to a method and apparatus for transmitting an HARQ ACK/NACK.

2. Discussion of the Background

Automatic repeat request (ARQ) is one of the schemes that enhance reliability of a wireless communication. The ARQ refers to a scheme in which a transmitter retransmits a data signal if a data signal reception is failed at a receiver. Further, there is a scheme, hybrid automatic repeat request (HARQ), which is a combination of Forward Error Correction (FEC) and ARQ. A receiver that utilizes HARQ generally attempts an error correction for a received data signal and determines whether a retransmission needs to be performed by using an error detection code. As the error detection code, Cyclic Redundancy Check (CRC) scheme may be used. If data signal error is not detected from the detection process of CRC scheme, the receiver determines that a decoding process for the data signal is successful. In this case, the receiver transmits an Acknowledgement (ACK) signal to a transmitter. If data signal error is detected from the detection process of CRC scheme, the receiver determines that a decoding process for the data signal is not successful. In this case, the receiver transmits a Not-Acknowledgement (NACK) signal to a transmitter. If the transmitter receives the NACK signal, the transmitter may retransmit the data signal.

A wireless communication system may support Frequency Division Duplex (FDD) scheme and Time Division Duplex (TDD) scheme. In the FDD scheme, an uplink transmission and a downlink transmission may be simultaneously performed in a cell because a carrier frequency for an uplink (UL) transmission is different from a carrier frequency for a downlink (DL) transmission exists. In the TDD scheme, with respect to one cell, an uplink transmission and a downlink transmission are distinguished from each other based on different time slots. In the TDD scheme, a base station and a user equipment perform switching operations between a transmission mode and a reception mode because the same carrier is used for both an uplink transmission and a downlink transmission. In the TDD scheme, a Special Subframe may be added to provide a guard time for switching between the transmission mode and the reception mode. The Special Subframe may include Downlink Pilot Time Slot (DwPTS), Guard Period (GP), and Uplink Pilot Time Slot (UpPTS). According to the TDD scheme, resource amounts for the uplink transmission and resource amounts for the downlink transmission may be asymmetrically assigned through various uplink (UL)-downlink (DL) configurations.

Currently, remaining frequency resources are scarce and various technologies have been utilized in wide frequency bands because of the frequency resource scarcity. For this reason, in order to provide a wideband bandwidth for supporting higher data-rate requirements, each of scattered bands has been configured to satisfy basic requirements to operate an independent system and a carrier aggregation (CA) scheme, which aggregates various frequency bands into one system, has been adopted. Here, each frequency band or carrier capable of an independent operation may be defined as a component carrier (CC). According to the adoption of the carrier aggregation system, ACK/NACK signals corresponding to a plurality of component carriers (CCs) need to be transmitted.

Recently, a Time Division Duplex (TDD)-Frequency Division Duplex (FDD) Carrier Aggregation (CA) that supports a CA and/or dual connectivity of a FDD band (or carrier) and a TDD band (or carrier) has been considered. The TDD-FDD CA is referred to as a TDD-FDD joint operation. However, when it is assumed that a plurality of serving cells that are aggregated by the CA exist, and a first serving cell is configured as TDD and a second serving cell is configured as FDD, there may be difficulty in transmitting a HARQ ACK/NACK for downlink (DL) transmission on all subframes of the second serving cell according to the TDD-FDD CA. For example, in a circumstance that allows only a control channel of the first serving cell (that is, a Physical Uplink Control Channel (PUCCH)) for transmitting a HARQ ACK/NACK of the second serving cell, a large number of DL subframes of the second serving cell may exist in association with a single UL subframe of the first serving cell. Therefore, there is desire for a method of effectively transmitting a HARQ ACK/NACK, for the TDD-FDD CA.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a terminal and a method for efficiently transmitting a Hybrid Automatic Repeat reQuest (HARQ) Acknowledgment (ACK)/Non-acknowledgment (NACK) in Carrier Aggregation (CA) of a TDD-based cell (or carrier) and an FDD-based cell (or carrier).

Exemplary embodiments of the present invention provide a base station and a method for efficiently receiving a HARQ ACK/NACK in CA of a TDD-based cell (or carrier) and an FDD-based cell (or carrier) based on FDD.

Exemplary embodiments of the present invention provide a method of transmitting a Hybrid Automatic Repeat reQuest (HARQ) response in a wireless communication system, the method including: recognizing, from a PDCCH or an EPDCCH, a 2-bit uplink (UL) downlink assignment index (DAI) field configured in a UL downlink control information (DCI) format; receiving a PDSCH transmission through the second serving cell; generating an HARQ response signal based on the number of PDSCHs scheduled in the downlink subframes indicated by the UL DAI field and the number of total downlink subframes associated with one uplink subframe; and transmitting the HARQ response signal through a PUSCH in the one uplink subframe.

Under the circumstance of CA of a TDD-based cell (or carrier) and an FDD-based cell (or carrier), a base station and a terminal may implement an effective HARQ ACK/NACK transmission method.

BRIEF DESCRIPTION OF THE DRAWINGS

FIG. 7 illustrates examples of capabilities of a terminal for a TDD-FDD CA according to an exemplary embodiment of the present invention.

FIG. 8 illustrates an example of a DL HARQ timing when a terminal for which a TDD-FDD CA is configured operates based on self-scheduling.

FIG. 9 illustrates an example of a DL HARQ timing when a terminal for which a TDD-FDD CA is configured operates based on cross-carrier scheduling.

DETAILED DESCRIPTION OF THE ILLUSTRATED EMBODIMENTS

Figure 1:
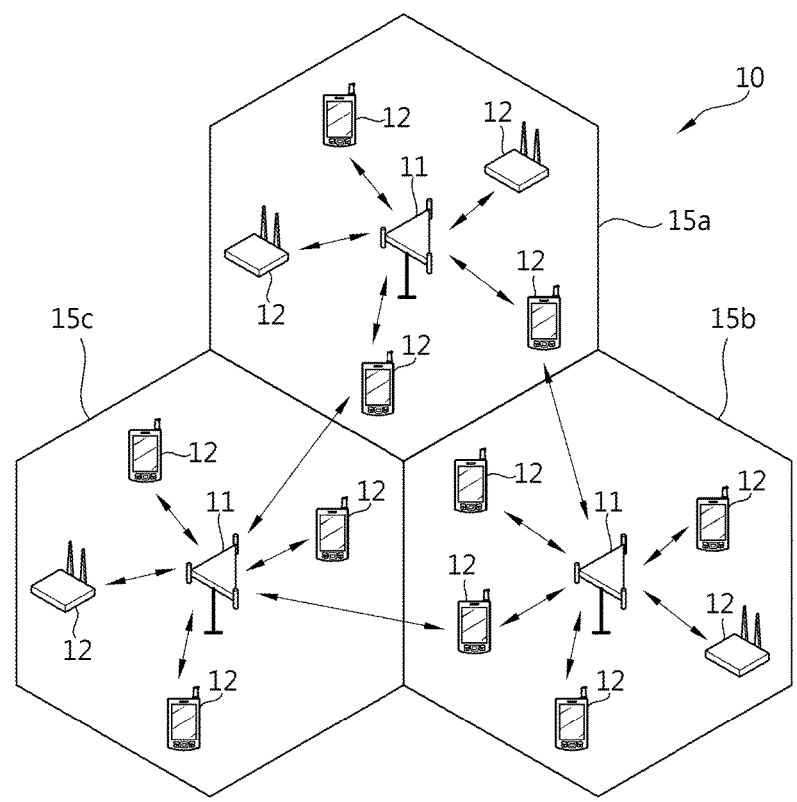
FIG. 1 illustrates a wireless communication system according to an exemplary embodiment of the present invention.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present.

Further, the description herein is related to a wireless communication network, and an operation performed in a wireless communication network may be performed in a process of controlling a network and transmitting data by a system that controls a wireless network (e.g., a base station) or may be performed in a user equipment connected to the wireless communication network.

FIG. 1 is a diagram illustrating a wireless communication system according to an exemplary embodiment of the present invention.

According to FIG. 1, a wireless communication system 10 is widely deployed in order to provide diverse telecommunication services, such as voice and packet data. A wireless communication system includes at least one base station 11 (BS). Each BS 11 provides telecommunication service to certain cells 15a, 15b, and 15c. A cell may again be divided into multiple sectors.

User equipment 12 (mobile station, MS) may be located at a certain location or mobile, and may also be referred to as different terms, including UE (user equipment), MT (mobile terminal), UT (user terminal), SS (subscriber station), wireless device, PDA (personal digital assistant), wireless modem, and handheld device. A base station 11 may also be referred to as eNB (evolved-NodeB), BTS (Base Transceiver System), Access Point, femto base station, Home nodeB, and relay. A cell inclusively refers to various coverage areas, such as mega cell, macro cell, micro cell, pico cell, and femto cell.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA. OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

Carrier Aggregation (CA), which is also referred to as spectrum aggregation or bandwidth aggregation, supports multiple carriers. Each individual unit carrier, which is aggregated by carrier aggregation, is referred to as Component Carrier (CC). Each component carrier is defined by bandwidth and center frequency. CA is introduced to support increasing throughput, to prevent cost increase due to the introduction of the wideband radio frequency and to ensure the compatibility with the existing system. For example, if five component carriers are allocated as granularity that has a carrier unit with 20 Hz bandwidth, it can support 100 MHz bandwidth at maximum.

CA may be divided as contiguous carrier aggregation, which is made among continuous CCs, and non-contiguous carrier aggregation, which is made among non-continuous CCs. The number of carriers aggregated between uplink and downlink may be configured differently. It is referred to as symmetric aggregation when there are equal number of downlink CCs and uplink CCs, and it is referred to as asymmetric aggregation when the number of downlink CCs and the number of uplink CCs are not equal.

The size of component carriers (in other words, bandwidth) may be different. For example, if five component carriers are used to form 70 MHz band, 5 MHz component carrier (carrier #0)+20 MHz component carrier (carrier #1)+20 MHz component carrier (carrier #2)+20 MHz component carrier (carrier #3)+5 MHz component carrier (carrier #4) may be aggregated together.

Hereinafter, a multiple carrier system includes the system that supports carrier aggregation. Contiguous CA and/or non-contiguous CA may be used in the multiple carrier system; in addition, both symmetric aggregation and asymmetric aggregation may be used in the multiple carrier system as well. A serving cell may be defined as a component frequency band based on multiple CC system which may be aggregated by CA. A serving cell may include a primary serving cell (PCell) and a secondary serving cell (SCell). A PCell means a serving cell which provides security input and Non-Access Stratum (NAS) mobility information on Radio Resource Control (RRC) establishment or re-establishment state. Depends on the capability of a user equipment, at least one cell may be used together with a PCell to form an aggregation of serving cells, the cell used with a PCell is referred to as an SCell. An aggregation of serving cells which configured for a user equipment may include one PCell, or one PCell together with at least one SCell.

Downlink component carrier corresponding to a PCell refers to Downlink (DL) Primary Component Carrier (PCC), and uplink component carrier corresponding to a PCell refers to Uplink (UL) PCC. In addition, downlink component carrier corresponding to an SCell refers to a DL Secondary Component Carrier (SCC), and an uplink component carrier corresponding to an SCell refers to a UL SCC. Only DL CC or UL CC may correspond to a serving cell, or a DL CC and an UL CC together may correspond to a serving cell.

Figure 2:
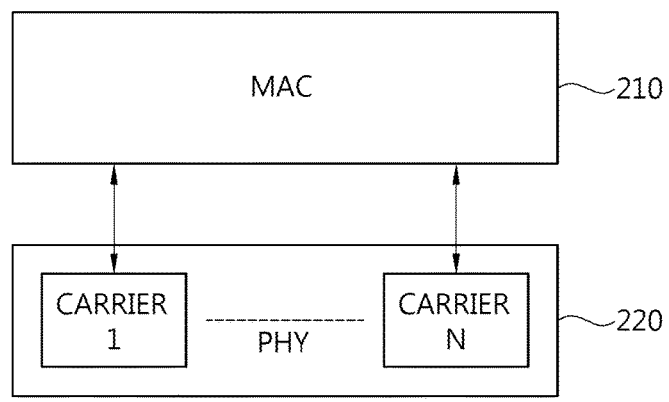
FIG. 2 illustrates an example of a protocol structure for supporting a multi-carrier system according to an exemplary embodiment of the present invention.

FIG. 2 is a diagram illustrating an example of a protocol structure for supporting a multi-carrier system according to an exemplary embodiment of the present invention.

Referring to FIG. 2, common Medium Access Control (MAC) entity 210 manages physical layer 220 which uses a plurality of carriers. The MAC management message, transmitting through a certain carrier, may be applied to other carriers. That is, the MAC management message is a message which controls other carriers including the certain carrier mentioned above. A physical layer 220 may be operated by the Time Division Duplex (TDD) and/or the Frequency Division Duplex (FDD).

There are some physical control channels used in physical layer 220. As a DL physical channel, a Physical Downlink Control Channel (PDCCH) informs to a UE with regard to resource allocation of a Paging Channel (PCH) and a Downlink Shared Channel (DL-SCH), and a Hybrid Automatic Repeat Request (HARQ) information related to a DL-SCH. The PDCCH may carry uplink grant which informs a resource allocation of uplink transmission to a UE. The DL-SCHO is mapping to a Physical Downlink Shared Channel (PDSCH). A Physical Control Format Indicator Channel (PCFICH), which transmits every sub-frame, informs the number of OFDM symbols used on the PDCCHs to a user equipment. A Physical Hybrid ARQ Indicator Cannel (PHICH), as a DL channel, carries the HARQ ACK/NACK signals as a response to uplink transmission. As a UL physical channel, Physical Uplink Control Channel (PUCCH) may carry UL controlling information such as ACK(Acknowledgement)/NACK(Non-acknowledgement) or Channel Status Information (CSI) which includes Channel Quality Indicator (CQI), Precoding Matrix Index (PMI), Precoding Type Indicator (PTI) or Rank Indication (RI). The Physical Uplink Shared Channel (PUSCH) carries the Uplink Shared Channel (UL-SCH). The Physical Random Access Channel (PRACH) carries random access preamble.

A plurality of the PDCCH may be transmitted in the controlled region, and a user equipment can monitor a plurality of the PDCCH. The PDCCH is transmitted on either one Control Channel Element (CCE) or an aggregation of several consecutive CCEs. The CCE is a logical allocation unit used to provide PDCCH with a code rate based on the state of radio channel. The CCE corresponds to a plurality of Resource Element Groups. The format of the PDCCH and the number of available bits for the PDCCH are determined according to the relationship between the number of CCEs and a code rate provided by the CCEs.

Control information carried on the PDCCH is referred to as Downlink Control Information (DCI). The following table 1 shows DCI pursuant to several formats.

TABLE 1

| DCI Format | Description |
| --- | --- |
| 0 | Used for PUSCH scheduling in uplink cell |
| 1 | Used for one PDSCH codeword scheduling in one cell |
| 1A | Used for brief scheduling of one PDSCH codeword in one cell or random access process initialized by the PDCCH command |
| 1B | Used for a brief scheduling of one PDSCH codeword with precoding information in one cell |
| 1C | Used for one PDSCH codeword brief scheduling in one cell or the notification of MCCH change |
| 1D | Used for a brief scheduling of one PDSCH codeword in one cell including precoding or power offset information |
| 2 | Used for the PDSCH scheduling of the user equipment configured of spartial multiplexing mode. |
| 2A | Used for the PDSCH scheduling of the user equipment configured of large delay CDD mode |
| 2B | Used in the transmission mode 8 (a double layer transmission, etc) |
| 2C | Used in the transmission mode 9 (a multi layer transmission) |
| 2D | Used in the transmission mode 10 (CoMP) |
| 3 | Used for the tramission of TPC commands for PUCCH and PUSCH including 2-bit power adjustment |
| 3A | Used for the tramission of TPC commands for PUCCH and PUSCH including single-bit power adjustment |
| 4 | Used for the PUSCH scheduling in the uplink multi-antenna port transmission cell |

Referring to Table 1. There are DCI formats such as format 0 used for the PUSCH scheduling in uplink cell, format 1 used for one PDSCH codeword scheduling in one cell, format 1A used for compact scheduling of one PDSCH codeword, format 2 used for the PDSCH scheduling in closed-loop spatial multiplexing mode, format 2B used for the PDSCH scheduling in open-loop spatial multiplexing mode, format 2B used in the transmission mode 8, format 2C used in the transmission mode 9, format 2D used in the transmission mode 10, format 3 and 3A used for the uplink transmission of TPC commands for the PUCCH and the PUSCH, and format 4 used for the the PUSCH scheduling in the uplink multi-antenna port transmission cell.

Each field of DCI is sequentially mapped to n number of information bits $a_0$ or $a_{n-1}$. For example, the DCI is mapped to a total length of 44 bits of information bits, each field of DCI is mapped sequentially to $a_0$ or $a_{43}$. DCI formats 0, 1A, 3, 3A may have the same payload size. DCI format 0, 4 may be referred to as the Uplink grant (UL grant).

Cross-carrier scheduling is a scheduling method capable of performing resource allocation of a PDSCH transmitted by using a different carrier through a PDCCH transmitted through a specific CC and/or resource allocation of a PUSCH transmitted by using another CC other than a CC basically linked to the specific CC. That is, the PDCCH and the PDSCH may be transmitted through different DL CCs, and the PUSCH may be transmitted through a UL CC other than a UL CC linked to a DL CC on which a PDCCH including a UL grant is transmitted. Here, the cross-carrier scheduling is different from the self-scheduling. The self-scheduling is a scheduling method in which a component carrier through which a PDCCH/EPDCCH is transmitted is identical to a component carrier through which a PDSCH is transmitted, and a component carrier through which a PDCCH/EPDCCH is transmitted is identical to a DL component carrier that is linked with a UL component carrier through which a PUSCH is transmitted.

During cross-carrier scheduling, a user equipment only receives scheduling information (such as UL grant) through a serving cell (or CC). Hereinafter, a serving cell (or CC) performing cross-carrier scheduling may refer to scheduling cell (or CC), and a serving cell being scheduled by scheduling cell may refer to scheduled cell (or CC). Scheduling cell may refer to ordering cell, and scheduled cell may refer to following serving cell. For example, a scheduled cell may be scheduled by a scheduling cell. Scheduling information for the scheduled cell may be received through the scheduling cell.

As such, in a system supporting the cross-carrier scheduling, a carrier indicator is necessary to report which DL CC/UL CC was used to transmit the PDCCH/EPDCCH which indicates the PDSCH/PUSCH transmission. A field including the carrier indicator is hereinafter called a carrier indication field (CIF). Hereinafter, configuration of CIF may mean that configuration of cross-carrier scheduling.

The aforementioned cross-carrier scheduling may be classified into the DL cross-carrier scheduling and UL cross-carrier scheduling. The DL cross-carrier scheduling implies a case where the CC for transmitting the PDCCH/EPDCCH including resource allocation information for the PDSCH transmission and other information is different from a CC for transmitting the PDSCH. The UL cross-carrier scheduling implies a case where a CC for transmitting the PDCCH/EPDCCH including a UL grant for the PUSCH transmission is different from the DL CC linked to the UL CC for transmitting the PUSCH.

Figure 3:
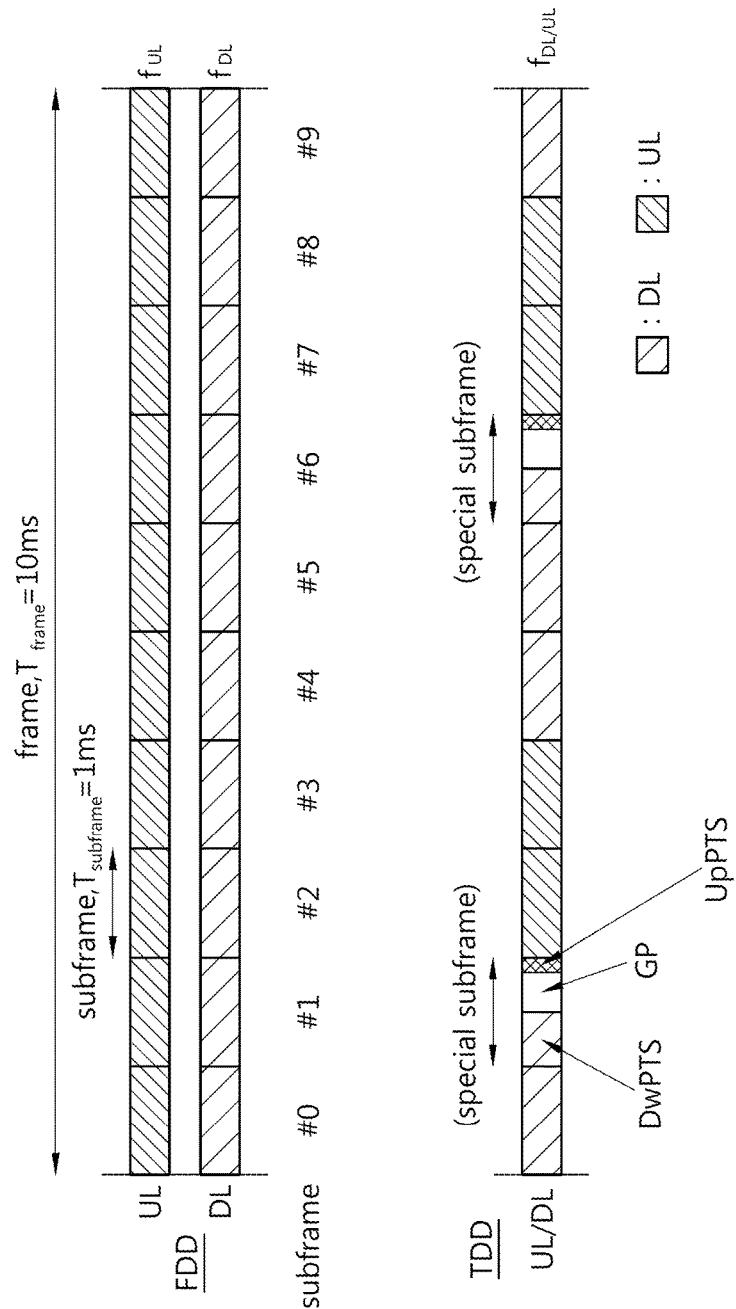
FIG. 3 illustrates an example of a radio frame structure according to an exemplary embodiment of the present invention.

FIG. 3 is a diagram illustrating an example of a radio frame structure according to an exemplary embodiment of the present invention. The diagram illustrates a FDD radio frame structure and a TDD radio frame structure.

Referring to FIG. 3, one radio frame includes 10 subframes, and one subframe includes 2 consecutive slots.

In the FDD, both carrier used for UL transmission and carrier used for DL transmission exist, and UL transmission and DL transmission may be performed simultaneously in one cell.

In the TDD, on one cell basis, UL transmission and DL transmission can always distinguished in time. Because a same carrier is used for both UL transmission and DL transmission, a base station and user equipment repeatedly switches between the transmission mode and the reception mode. In the TDD, special subframe may be placed to provide a guard time which is for switching mode between the transmission and the reception. Special subframe, as shown, includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is needed to avoid interference between an uplink and a downlink, and during the GP, no UL transmission and DL transmission occurs.

Table 2 shows an example of UL/DL configuration of radio frame. UL/DL configuration defines reserved subframe for UL transmission or reserved subframe for DL transmission. That is, UL/DL configuration informs the rules how the uplink and the downlink are allocated (or reserved) in every subframe of one radio frame.

TABLE 2

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, 'D' denotes a DL subframe, 'U' denotes a UL subframe, and 'S' denotes a special subframe. As shown to Table 2, subframe 0 and 5 are always allocated to DL transmission, and subframe 2 is always allocated to UL-transmission. As shown to Table 2, each UL-DL configuration has a different number and position of DL subframe and UL subframe in one radio frame. Through diverse UL-DL configuration, the amount of resource allocated to UL/DL transmission may be given asymmetrically. To avoid severe interference between UL and DL among cells, neighboring cells generally have same UL-DL configuration.

The point changing from DL to UL or the point changing from UL to DL is referred to as the switching point. The switch-point periodicity, which is either 5 ms or 10 ms, means a repeating period of the same changing aspect between the UL subframe and DL subframe. For example, referring to the UL/DL configuration 0, subframe from 0 to 4 changes D→S→U→U→U, subframe from 5 to 9 changes, as same as before, D→S→U→U→U. Since one subframe is 1 ms, the switch-point periodicity is 5 ms. That is, the switch-point periodicity is shorter than the length of one radio frame (10 ms), the changing aspect in the radio frame is repeated for one time.

The UL-DL configuration in above Table 2 may be transmitted from a base station to a user equipment through system information. The base station may inform a UL/DL allocation status change in a radio frame to a UE by transmitting the index of the UL/DL configuration whenever the UL/DL configuration changes. Or the UL/DL configuration may be control information which is transmitted to every UE in the cell through broadcast channel.

Figure 4:
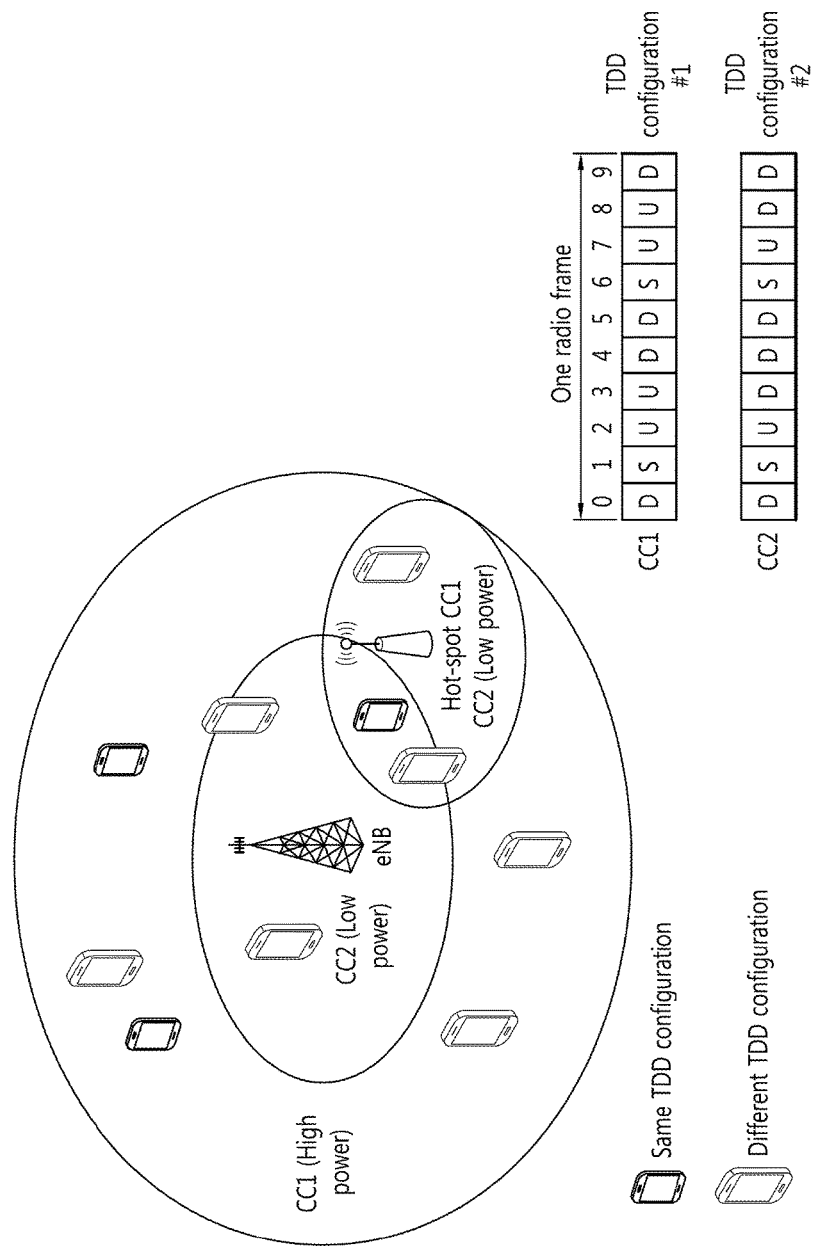
FIG. 4 illustrates a case of an inter-band CA of serving cells having different TDD UL-DL configurations.

FIG. 4 illustrates a case of an inter-band CA of serving cells having different TDD UL-DL configurations.

Referring to FIG. 4, component carriers that configure a CA with a terminal are CC1 and CC2, the CC1 may be configured as UL-DL configuration #1 and CC2 may be configured as UL-DL configuration #2, for the purpose of traffic adaption (semi-static) and avoidance of interference between heterogeneous networks. For example, to avoid an interference issue with other TDD systems (for example, TDS-CDMA, WiMAX, and the like) that co-exist in an identical band, different UL-DL configurations may be required in an inter-band CA. In addition, when a UL-DL configuration including a large number of UL subframes is applied to a low frequency band, and a UL-DL configuration including a small number of UL subframes is applied to a high frequency band, it may be helpful for the coverage enhancement.

For the TDD, when a terminal is configured with one or more serving cells, at least two serving cells have different UL-DL configurations, and one of the serving cells is a PCell, a UL-DL configuration of the PCell is a DL reference UL-DL configuration. Here, the DL reference UL-DL configuration indicates a UL-DL configuration used as a reference for a DL HARQ timing of a serving cell.

Meanwhile, for the TDD, when a terminal is configured with two or more serving cells, at least two serving cells have different UL-DL configurations, and one of the serving cells is an SCell, a DL reference UL-DL configuration for the SCell is as shown in the following Table 3.

TABLE 3

| Set # | (Primary cell UL/DL configuration, Secondary cell UL/DL configuration) | DL-reference UL/DL configuration |
|---|---|---|
| Set 1 | (0, 0) | 0 |
|  | (1, 0), (1, 1), (1, 6) | 1 |
|  | (2, 0), (2, 2), (2, 1), (2, 6) | 2 |
|  | (3, 0), (3, 3), (3, 6) | 3 |
|  | (4, 0), (4, 1), (4, 3), (4, 4), (4, 6) | 4 |
|  | (5, 0), (5, 1), (5, 2), (5, 3), (5, 4), (5, 5), (5, 6) | 5 |
|  | (6, 0), (6, 6) | 6 |
| Set 2 | (0, 1), (6, 1) | 1 |
|  | (0, 2), (1, 2), (6, 2) | 2 |
|  | (0, 3), (6, 3) | 3 |
|  | (0, 4), (1, 4), (3, 4), (6, 4) | 4 |
|  | (0, 5), (1, 5), (2, 5), (3, 5), (4, 5), (6, 5) | 5 |
|  | (0, 6) | 6 |
| Set 3 | (3, 1), (1, 3) | 4 |
|  | (3, 2), (4, 2), (2, 3), (2, 4) | 5 |
| Set 4 | (0, 1), (0, 2), (0, 3), (0, 4), (0, 5), (0, 6) | 0 |
|  | (1, 2), (1, 4), (1, 5) | 1 |
|  | (2, 5) | 2 |
|  | (3, 4), (3, 5) | 3 |
|  | (4, 5) | 4 |
|  | (6, 1), (6, 2), (6, 3), (6, 4), (6, 5) | 6 |
| Set 5 | (1, 3) | 1 |
|  | (2, 3), (2, 4) | 2 |
|  | (3, 1), (3, 2) | 3 |
|  | (4, 2) | 4 |

In Table 3, based on a pair of a PCell UL-DL configuration and an SCell UL-DL configuration, the DL reference UL-DL configuration for the SCell may be indicated.

For example, when the pair of the PCell UL-DL configuration and the SCell UL-DL configuration of Table 4 belongs to Set 1, the DL reference UL-DL configuration for the SCell applies a DL HARQ timing based on the DL reference UL-DL configuration for Set 1. In this instance, it is irrespective of a scheduling method.

Alternatively, in a case in which self-scheduling is set for a terminal, when the pair of the PCell UL-DL configuration and the SCell UL-DL configuration belongs to Set 2 or Set 3, a DL reference UL-DL configuration of Set 2 or Set 3 is used. Here, when self-scheduling is set for the terminal, it indicates that the terminal is not set to monitor a PDCCH/EPDCCH of another serving cell for scheduling of a corresponding serving cell.

Alternatively, in a case in which cross-carrier scheduling is set for a terminal, when the pair of the PCell UL-DL configuration and the SCell UL-DL configuration belongs to Set 4 or Set 5, a DL reference UL-DL configuration of Set 4 or Set 5 is used. Here, when cross-carrier scheduling is set for the terminal, it indicates that the terminal is set to monitor a PDCCH/EPDCCH of another serving cell for scheduling of a corresponding serving cell.

That is, the DL reference UL-DL configuration of Set 1 is applied when a corresponding pair is satisfied, irrespective of whether a Carrier Indicator Field (CIF) indicating a carrier associated with scheduling is configured. Conversely, Set 2 and Set 3 are applied to only a terminal for which a CIF is not configured, and Set 4 and Set 5 are applied to only a terminal for which a CIF is configured.

An ACK/NACK signal with respect to a PDCCH/EPDCCH that indicates a PDSCH or SPS release corresponding to each of a plurality of serving cells of a CA may be transmitted through PUCCH at the above described HARQ timing.

Various PUCCH formats may be provided based on Uplink Control Information (UCI) to be transmitted. PUCCH format 1a may be used for transmitting a 1-bit HARQ ACK/NACK, or may be used for transmitting a positive Scheduling Request (SR) and a 1-bit HARQ ACK/NACK in a case of FDD. PUCCH format 1b may be used for transmitting a 2-bit HARQ ACK/NACK, or may be used for transmitting a positive SR and a 2-bit HARQ ACK/NACK. When one or more serving cells are configured for a terminal or when a single serving cell is configured for a terminal in a case of TDD, PUCCH format 1b with channel selection may be used for transmitting a maximum of a 4 bit-HARQ ACK/NACK. PUCCH format 1 may be used for transmitting a positive SR. PUCCH format 2 may be used for transmitting Channel State information (CSI) that is not multiplexed with a HARQ ACK/NACK, or may be used for transmitting CSI that is multiplexed with a HARQ ACK/NACK in a case of an extended Cyclic Prefix (CP). PUCCH format 2a may be used for transmitting CSI that is multiplexed with a 1-bit HARQ ACK/NACK in a case of a normal CP. PUCCH format 2b may be used for transmitting CSI that is multiplexed with a 2-bit HARQ ACK/NACK in a case of a normal CP. PUCCH format 3 may be used for transmitting a maximum of a 10-bit HARQ ACK/NACK in a case of FDD, and may be used for transmitting a maximum of a 20-bit HARQ ACK/NACK in a case of TDD. Alternatively, in a case of FDD, PUCCH format 3 may be used for transmitting a 10-bit HARQ ACK/NACK and a 1-bit positive/negative SR, which corresponds to a maximum of 11 bits. In a case of TDD, PUCCH format 3 may be used for transmitting a 20-bit HARQ ACK/NACK and a 1-bit positive/negative SR, which corresponds to a maximum of 21 bits. Alternatively, PUCCH format 3 may be used for transmitting a HARQ ACK/NACK with respect to a single serving cell, a 1-bit positive/negative SR, and CSI.

Hereinafter, HARQ will be described. A base station transmits a DL grant, which is PDSCH scheduling information, to a terminal through a PDCCH or an EPDCCH, and transmits a PDSCH. Then, the terminal transmits a HARQ Acknowledgement/Non-acknowledgement (ACK/NACK) with respect to a DL-SCH Transport Block (TB) received through the PDSCH, trough a PUCCH at a predetermined timing. The base station repeats the process during a predetermined period of time until receiving a HARQ ACK signal from the terminal, which is referred to as HARQ. In other words, from the perspective of the base station, HARQ refers to an operation that receives a HARQ ACK/NACK with respect to a DL transmission from the terminal, and executes a DL retransmission or a new transmission. From the perspective of the terminal, HARQ refers to an operation that transmits a HARQ ACK/NACK with respect to a DL transmission to the base station, and receives a DL retransmission or a new transmission.

For the FDD, when a terminal detects a PDSCH transmission for the corresponding terminal from a subframe n-k, the terminal transmits a HARQ response in a subframe n.

For TDD, when PDSCH transmission indicated by detection of a corresponding PDCCH/EPDCCH exists in a subframe n-k, or when a PDCCH/EPDCCH indicating Semi-Persistent Scheduling (SPS) release exists, the terminal transmits a HARQ response in a subframe n. In this instance, DL HARQ ACK/NACK timings may be listed as shown in Table 4.

TABLE 4

| UL/DL config-uration | subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In Table 4, n denotes a subframe number, and a "DL subframe set" associated with a subframe of the corresponding number is determined by $K=\{k_0, k_1, \ldots, k_{M-1}\}$. n-k denotes an index of a subframe that is k subframes before from an $n^{th}$ subframe, and indicates a DL subframe (that is, a DL HARQ timing) associated with a current subframe. The associated DL subframe indicates a subframe that delivers a PDSCH which is the basis of the determination on a HARQ ACK/NACK signal. M denotes the number of elements of a set K defined in table 3, and indicates the number of DL subframes associated with the $n^{th}$ subframe, or a bundling window size.

For example, when UL-DL configuration 1 is applied to a serving cell, M of a DL subframe set K associated with a subframe 2 is 2 (M=2), $k_0=7$, and $k_1=6$. Therefore, DL subframes (or DL HARQ timings) associated with the subframe 2 of the corresponding serving cell are a subframe 5 (2-$k_0$) and a subframe 6 (2-$k_1$) of a previous radio frame.

When PUCCH format 1b with channel selection and two serving cells having an identical UL-DL configuration are configured for a terminal, the terminal may determine a downlink subframe set (K) associated with an $n^{th}$ subframe and the number of downlink subframes (M) associated with the $n^{th}$ subframe, based on Table 4. The terminal may determine a PUCCH resource allocation scheme or a channel selection mapping table, based on an M value. However, two serving cells (for example, a PCell and an SCell) having different UL-DL configurations are configured for a terminal for which PUCCH format 1b with channel selection is configured, the number $M_{primary}$ of associated downlink subframes of the PCell and the number $M_{secondary}$ of associated downlink subframes of the SCell are different and thus, the terminal may need to determine an M value. In this instance, the terminal may determine an M value based on a greater value between the two M values. That is, M=max($M_{primary}$, $M_{secondary}$). In this instance, Discontinuous Transmission (DTX) may be mapped as a HARQ-ACK state of a serving cell having a smaller M value.

Figure 5:
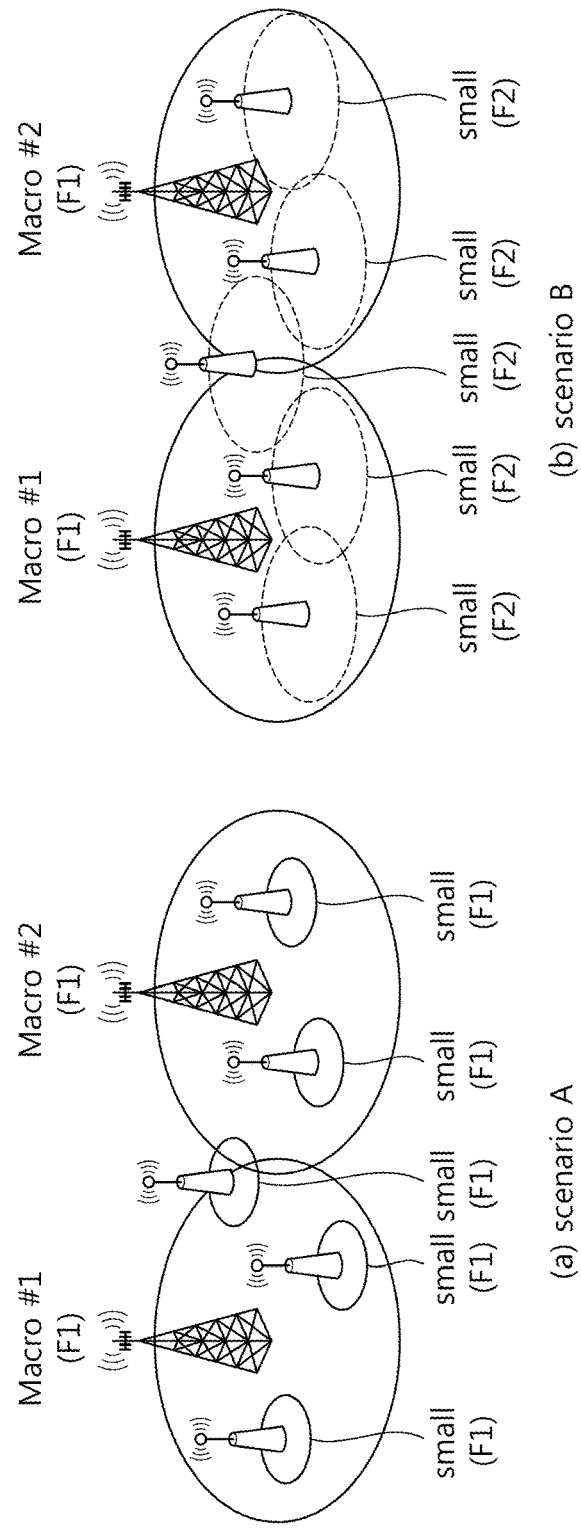
FIG. 5 illustrates an example of a deployment scenario according to an exemplary embodiment of the present invention.

FIG. 5 illustrates an example of a deployment scenario according to an embodiment of the present invention.

Referring to FIG. 5, a plurality of macro cells and a plurality of small cells (for example, pico cells or femto cells) may be disposed, having an identical frequency or adjacent frequencies. (a) A deployment scenario in which a plurality of outdoor small cells use a frequency band identical to a frequency band of macro cells (b) A deployment scenario in which a plurality of small cells use an identical frequency band, macro cells use a frequency band adjacent to the frequency band of the small cells, all of the macro cells have an identical UL-DL configuration, and the small cells may adjust a UL-DL configuration FIG. 6 is a diagram illustrating an example of an FDD-TDD CA method application according to an exemplary embodiment of the present invention.

Figure 6:
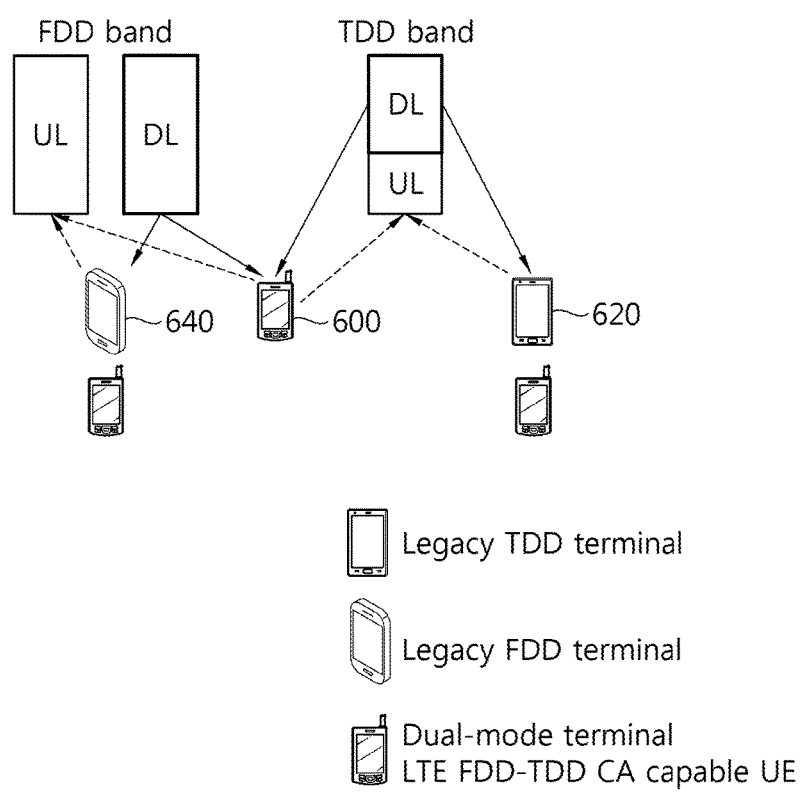
FIG. 6 illustrates an example of an FDD-TDD CA scheme according to an exemplary embodiment of the present invention.

Referring FIG. 6, in case of the TDD legacy UE 620, wireless communication service can only be received through the TDD band, and in case of the legacy FDD UE 640, wireless communication service can only be received through the FDD band. On other hands, in case of the FDD-TDD CA capable UE 600, wireless communication service may be received through the FDD and the TDD bands, and also the CA based wireless communication service is provided through the TDD band carrier and the FDD band carrier.

For those aforementioned TDD-FDD CA, for example, the following deployments may be considered.

As an example, the FDD base station and the TDD base station is co-located (for example, CA scenarios 1 through 3), or the FDD base station and the TDD based station is not co-located, but connected through the ideal backhaul (for example, CA scenario 4).

As another example, the FDD base station and the TDD base station is not co-located, and connected through non-ideal backhaul (for example, small cell scenario 2a, 2b, and macro-macro scenario).

However, for the TDD-FDD CA, it is desirable that the TDD base station and the FDD base station is connected through the ideal backhaul and the TDD cell and the FDD cell is operated as synchronized.

In addition, for the TDD-FDD CA, following prerequisite may be considered.

First, a UE supporting the FDD-TDD CA may access to the legacy FDD single mode carrier and the legacy TDD single mode carrier.

Second, the legacy FDD UEs and the UEs supporting the TDD-FDD CA may camp on and be connected to the FDD carrier which is the part of the aforementioned FDD/TDD network.

Third, the legacy TDD UEs and the UEs supporting the TDD-FDD CA may camp on and be connected to the TDD carrier which is the part of the aforementioned FDD/TDD joint operation network.

Fourth, a network architecture enhancement in order to facilitate the FDD-TDD CA, for example, with regard to the non-ideal backhaul, may be considered. However, keeping the minimal network architecture changes should be considered since it is still essential in operator's perspective.

In addition, as a UE to support the TDD-FDD CA, following UE abilities may be considered.

FIG. 7 is examples of UE capabilities for the TDD-FDD CA according to an exemplary embodiment of the present invention.

Referring to FIG. 7, (a) indicates that a UE is supporting the CA between the TDD carrier and the FDD carrier; (b) indicates that a UE is supporting the CA between the TDD carrier and the FDD DL carrier; and (c) indicates that a UE is supporting the CA between the TDD carrier with a DL subframe and the FDD carrier.

As mentioned above, a UE may support different types of the TDD-FDD CA, and further, it may perform simultaneous reception (that is, DL aggregation) from the FDD and TDD carriers. Secondly, a UE may perform simultaneous transmission (that is, UL aggregation) from the FDD and TDD carriers, and thirdly, a UE may perform simultaneous transmission and reception (that is, full duplex) from the FDD and TDD carriers.

In the above described TDD-FDD CA, a maximum number of aggregated Component Carriers (CCs) may be, for example, 5. In addition, an aggregation of different UL-DL configurations for TDD carriers of different bands may be supported.

In this instance, the FDD-TDD CA-capable terminal may support the TDD-FDD DL CA and may not support the TDD-FDD UL CA. The FDD-TDD CA-capable terminal may support at least the TDD-FDD DL CA, but may or may not support the TDD-FDD UL CA.

Meanwhile, a UE may configure a dual connectivity through two or more base stations among base stations that may include at least one serving cell. A dual connectivity is an operation that the UE utilizes wireless resources provided by at least two different network points (for example, a macro base station or a small base station) in RRC_CONNECTED mode. In this case, those abovementioned two different network points may be connected by a non-ideal backhaul. Here, one of those abovementioned two different network points may refer to a macro base station (or a master base station or an anchor base station), remaining network points may refer to small base stations (or secondary base stations or assisting base stations, or slave base stations).

A UE, as mentioned above, may support a TDD-FDD joint operation when the CA and/or dual connectivity is configured to the UE. Hereinafter, aspects of the present invention will be explained based on a case where a UE configured to the CA, but aspects of the present invention may be applied to a case of a UE configured to the dual connectivity.

The TDD-FDD CA may include an environment in which a PCell operates as TDD and an SCell operates as FDD. The environment is irrespective of a scheduling scheme, but has a high probability of being provided when self-scheduling is used. Hereinafter, a DL HARQ timing to be applied to an SCell based on a relationship with a PCell which is a PUCCH transmission serving cell, will be described.

FIG. 8 illustrates an example of a DL HARQ timing when a terminal for which a TDD-FDD CA is configured operates based on self-scheduling. FIG. 8 corresponds to a case in which a PCell is configured as TDD UL-DL configuration 1, and an SCell is configured as FDD.

When the terminal operates based on self-scheduling as shown in FIG. 8, an existing FDD DL HARQ timing may be applied to an SCell. However, in this instance, the PCell which is a PUCCH transmission serving cell is configured as TDD and thus, this may result in failure of transmission of a PDSCH in many DL subframes  by taking into account of a location of a UL subframe of the PCell. This may deteriorate a peak data rate that a single terminal may support.

FIG. 9 illustrates an example of a DL HARQ timing when a terminal for which a TDD-FDD CA is configured operates based on cross-carrier scheduling. FIG. 9 corresponds to a case in which a PCell is configured as TDD UL-DL configuration 1, and an SCell is configured as FDD.

When a cross-carrier scheduling is configured for the terminal and an existing FDD DL HARQ timing is applied to the SCell, as shown in FIG. 9, the PCell which is a PUCCH transmission serving cell is configured as TDD and thus, this may result in failure of transmission of a PDSCH in many DL subframes  due to a lack of a DL scheduling indicating method in addition to the drawback of the PCell for the PUCCH transmission. For example, in a case of self-scheduling, a terminal may receive a PDSCH and a PDCCH/EPDCCH that indicates the PDSCH on a subframe 3 of the SCell, and may transmit a HARQ ACK/NACK with respect to the reception to a base station on a subframe 7 of the PCell. However, in a case of cross-carrier scheduling, a subframe 3 of the PCell having TDD UL-DL configuration 1 is a DL subframe and thus, a PDCCH/EPDCCH indicating the PDSCH is not transmitted and thus, the terminal may not transmit a HARQ ACK/NACK on the subframe 7 of the PCell.

As illustrated in FIGS. 8 and 9, a drawback of a DL HARQ timing for a PDSCH transmitted on an SCell (FDD) exists in all scheduling schemes in the TDD-FDD CA environment. To overcome the drawback, a new DL HARQ timing for an SCell needs to be designed. Designing a new DL HARQ timing includes adding a new DL HARQ timing for the TDD or employing a new DL HARQ timing for the TDD-FDD CA.

By taking into consideration the designed new HARQ timing, there is a desire for a method and apparatus for transmitting a HARQ ACK/NACK with respect to a PDSCH of all of the DL subframes on a serving cell that operates based on FDD. Therefore, the present invention provides an improved method and apparatus for transmitting a HARQ ACK/NACK, which may be applicable to the TDD-FDD CA. In addition, the present invention provides an improved method and apparatus for receiving a HARQ ACK/NACK, which may be applicable to the TDD-FDD CA.

At least one of the following conditions may be used to define a new DL HARQ timing.

i) A new DL HARQ timing may be defined or designed to allow PDSCH transmission in all DL subframes of an SCell (FDD). This may optimize performance of the overall system and a peak data rate of a terminal.

ii) A terminal that supports TDD(PCell)-FDD(SCell) CA may use PUCCH format 1b with channel selection That is, a channel selection-based transmission method that uses PUCCH format 1b format may be configured for a terminal, for transmission of HARQ-ACK information on a PUCCH during a CA.

iii) Since a new DL HARQ timing is added, DL HARQ timing values for indicating DL subframes associated with a single UL subframe may be identified as a legacy DL HARQ timing value and a new DL HARQ timing value. Accordingly, the DL subframes may be distinguished as a DL subframe associated with a legacy DL HARQ timing (hereinafter, legacy associated subframe) and a DL subframe associated with a new DL HARQ timing (hereinafter, new associated subframe). Accordingly, a new index $k_0'$, $k_1'$, . . . for indicating a new associated subframe may be added to a DL subframe set K={$k_0, k_1, \ldots, K_{M-1}$} associated with a current UL subframe.

iv) HARQ ACKs/NACKs may be bundled between a legacy associated subframe and a new associated subframe, based on a ratio of 1:1 or N:1. In this instance, a DL assignment index (DAI) for the bundled DL subframes may be fixed to be identical. According to the above, the number of bits used for the DAI is maintained, and the number of HARQ-ACK(j) may be maintained constantly to use the channel selection-based transmission method. Here, HARQ ACK/NACK bundling may include time bundling, spatial bundling, or a combination of time bundling and spatial bundling.

v) HARQ ACK/NACK bundling between a legacy associated subframe and a new associated subframe may be executed when a PDCCH and/or an EPDCCH that indicates PDSCH transmission exists in all of the legacy associated subframes and the new associated subframe (that is, a case in which a DAI value of 5 exists when M=5). That is, when PDSCH transmission is available in all of the legacy associated subframes and all of the new associated subframes associated with a predetermined UL subframe, a HARQ ACK/NACK for a PDSCH of a new associated subframe may be bundled with a HARQ ACK/NACK of a PDSCH of at least one legacy associated subframe.

Otherwise, HARQ ACK/NACK bundling may not be executed between a legacy associated subframe and a new associated subframe. That is, HARQ ACK/NACK transmission identical to the existing method may be executed.

vi) A HARQ ACK/NACK may be transmitted through PUCCH format 1b based on channel selection or may be transmitted through a PUSCH based on whether PUSCH transmission exists. The HARQ ACK/NACK transmission may be executed on a PCell or an SCell. However, it is basically understood that the HARQ ACK/NACK transmission is executed on the PCell.

Based on the above described conditions, a new DL HARQ timing for a SCell in TDD(PCell)-FDD(SCell) CA may be defined as shown in Table 5.

Therefore, the present invention provides the following method to solve the problem that may occur when a new DL HARQ timing for an SCell is applied in the TDD-FDD CA environment.

Figure 10:
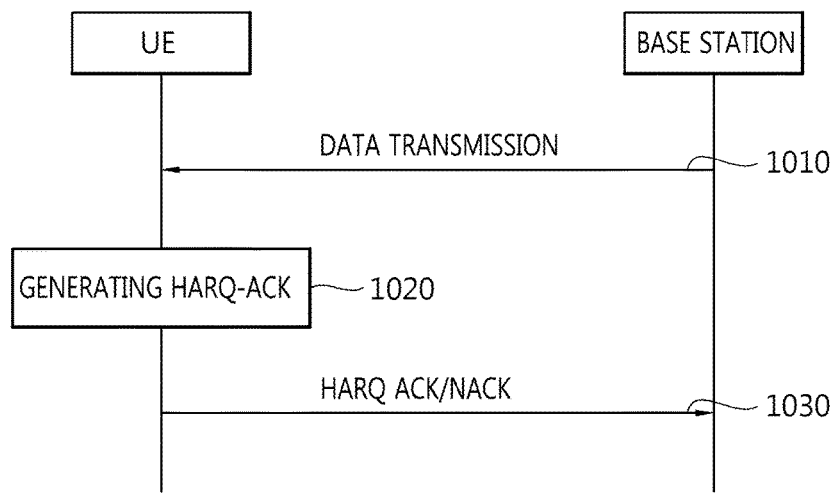
FIG. 10 is a flowchart illustrating a HARQ ACK/NACK transmission method of a terminal when PUCCH format 1b with channel selection and two serving cells having different frame structures are configured for the terminal, according to an embodiment of the present invention.

FIG. 10 is a flowchart illustrating a HARQ ACK/NACK transmission method of a terminal when PUCCH format 1b with channel selection and two serving cells having different frame structures are configured for the terminal, according to an embodiment of the present invention.

Referring to FIG. 10, a base station transmits data over a PCell or an SCell configured for a terminal, in operation S1010. The PCell may operate based on a TDD scheme, and the SCell may operate based on an FDD scheme. The data may be referred to as a Transport Block (TB) or a CodeWord (CW), and a plurality of TBs (or CWs) may be transmitted over a single subframe. The data may be mapped to a PDSCH, and may be transmitted. Together with the data, a PDCCH or an EPDCCH indicating resources used for transmission of the data may be transmitted. A DCI including a DAI value may be mapped to the PDCCH. A DAI value associated with a new associated subframe may or may not be identical to a DAI value of at least one legacy associated subframe. The data may be transmitted over a plurality of subframes. The plurality of subframes may include a plurality of legacy associated subframes and at least one new associated subframe. For example, the base station transmits a first TB in a first subframe of the SCell, transmits a second TB in a second subframe of the SCell, and transmits a third TD in a third subframe of the SCell. However, the plurality of subframes may not need to be consecutive subframes.

When the data is received from the base station, the terminal may generate a HARQ-ACK with respect to the received data in operation S1020. A HARQ-ACK may be indexed for each of the PCell and the SCell, based on a serving cell, an index of a CW (transmission of 2CWs in a case of DL MIMO transmission), or a DAI value.

First, a method of generating a HARQ-ACK in a PCell having M>2, will be described. In a case of M=1 or 2, a HARQ-ACK is indexed based on a serving cell, the number

TABLE 5

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0A | — | — | 6, [5] | [5], 4 | 4 | — | — | 6, [5] | [5], 4 | 4 |
| 0B | — | — | 6, [5], 4 | — | [5], 4 | — | — | 6, [5], 4 | — | 4 |
| 1 | — | — | 7, 6, [5] | [5], 4 | — | — | — | 7, 6, [5] | [5], 4 | — |
| 1* | — | — | 7, 6 | [6], [5], 4 | — | — | — | 7, 6 | [6], [5], 4 | — |
| 2 | — | — | 8, 7, 6, [5], 4 | — | — | — | — | 8, 7, 6, [5], 4 | — | — |
| 3 | — | — | 11, [10], [9], [8], 7, 6 | 6, 5 | 5, 4 | — | — | — | — | — |
| 4 | — | — | 12, 11, [10], [9], 8, 7 | 7, 6, 5, 4 | — | — | — | — | — | — |
| 5 | — | — | 13, 12, 11, [10], 9, 8, 7, 6, 5, 4 | — | — | — | — | — | — | — |
| 6 | — | — | [8], 7 | 7, [6] | [6], 5 | — | — | 7 | 7, [6], [5] | — |

In Table 5, a timing newly added for scheduling all of the downlink subframes on the SCell is written in a square bracket.

However, when a new DL HARQ timing for an SCell is applied in a TDD-FDD CA environment, as shown in Table 5, the maximum size of an existing bundling window that may be used for channel selection may be 4 but the maximum size of a bundling window ($M_{secondary}$) may be 6 (for UL-DL configuration 3 and UL-DL configuration 4) excluding the UL-DL configuration 5. Accordingly, it is difficult to utilize the existing channel selection mapping table.

of CWs in each serving cell, and an index of a CW, according to a table defined in advance, without using a DAI value. In a case of M>2, when the UL-DL configuration of a PCell of which a DAI value is included in a DL DCI format, correspond to 1, 2, 3, 4, or 6, and when a PDSCH that is transmitted without a PDCCH/EPDCCH does not exist, if PDSCH transmission exists together with transmission of a PDCCH and/or EPDCCH in an associated subframe on the PCell, and a DAI value of the PDCCH and/or EPDCCH is equal to j+1(0≤j≤M−1), the terminal generates HARQ-ACK(j), based on a corresponding DAI value of "j+1" indicating ACK, NACK, or DTX for data in each associated subframe. When a PDSCH is transmitted in the PCell without the transmission of a PDCCH/EPDCCH, the terminal may set HARQ-ACK(0) as ACK, NACK, or DTX for corresponding data, otherwise, sets HARQ-ACK(0) as DTX. For indexing HARQ-ACK(j) remaining after excluding HARQ-ACK(0), when a PDCCH/EPDCCH having a DAI value of "j" indicating PDSCH transmission (1≤j≤M−1) or a PDCCH/EPDCCH having a DAI value of "j" indicating DL SPS release is received, HARQ-ACK(j) may be indexed based on the DAI value of "j", and when the above described channels are not transmitted, HARQ-ACK (j) may be set as DTX.

Subsequently, a method of generating HARQ-ACK (j) in an SCell will be described. When PDSCH transmission exists together with the transmission of a PDCCH and/or EPDCCH in an associated subframe on the SCell, and a DAI value in the PDCCH and/or EPDCCH is identical to j+1 (0≤j≤M−1), a terminal generates HARQ-ACK(j) indicating ACK, NACK, or DTX with respect to data in each associated subframe.

For example, when M=1 or 2, the terminal may generate a HARQ-ACK with respect to data received through associated subframes of the PCell, based on a serving cell, the number of CWs in each serving cell, and an index of a CW, according to a predetermined table without depending on a DAI value, in the same manner as the PCell. When M>2, the terminal generates HARQ-ACK(0), HARQ-ACK(1), . . . , which are indexed based on a DAI value, with respect to data received through associated subframes of the PCell, and generates HARQ-ACK(0), HARQ-ACK(1), . . . which are indexed based on a DAI value, with respect to data received through associated subframes of the SCell. For example, a combination of three or four HARQ-ACK(j)s may exist in the PCell, and a combination of three or four HARQ-ACK (j)s exist in the SCell. HARQ-ACK (j) may be transmitted through a single uplink subframe using a channel selection mapping table, based on the state of three or four HARQ-ACK(j)s for each serving cell. Throughout the present specification, in the expression "HARQ ACK/NACK is transmitted through a single uplink subframe", the "HARQ ACK/NACK" may refer to a combination of a plurality of HARQ-ACK(j)s.

In this instance, the number $M_{secondary}$ of associated downlink subframes of the SCell becomes 5 or 6 by a new DL HARQ timing for the SCell as shown in Table 5, the terminal executes bundling of a HARQ ACK/NACK for a new associated subframe and a HARQ ACK/NACK for a legacy associated subframe so as to generate the state of four HARQ ACK/NACKs and thus, may transmit a HARQ ACK/NACK signal by utilizing the existing channel selection mapping table. That is, when M=5 or 6 on the SCell, HARQ-ACK(j) indexed by a DAI associated with the new associated subframe may be bundled with HARQ-ACK(j') of at least one legacy associated subframe. For example, HARQ-ACK(4) corresponds to a DAI value of 5, which may be a result of bundling of a HARQ ACK/NACK with respect to a PDSCH of a legacy associated subframe through which one of the PDCCH/EPDCCHs having a DAI<5 (for example, DAI=1 to 4) is transmitted and a HARQ ACK/NACK with respect to a PDSCH of the new associated subframe.

As described above, to utilize the existing channel selection mapping table, the terminal may determine an M value based on a greater M value from among a smaller value between the number $M_{secondary}$ of associated downlink subframes of the SCell and a predetermined value (for example, 4), and the number $M_{primary}$ of associated downlink subframes of the PCell. That is, the M value may be calculated based on Equation M=max($M_{primary}$, min($M_{secondary}$, 4)). When the smaller value between the number $M_{secondary}$ of associated downlink subframes of the SCell and the predetermined value, is smaller than the determined M value (that is, min($M_{secondary}$, 4)<M), the terminal may map the state of HARQ-ACK(j) associated with a j value (j=min($M_{secondary}$, 4) to M−1) for the corresponding SCEll, as DTX.

The terminal may select a channel selection mapping table based on the determined M value, and may map a HARQ-ACK to a predetermined resource index and a modulation symbol, based on the selected channel selection mapping table. The terminal may transmit, to the base station, a HARQ ACK/NACK using the resource index and the modulation symbol in a determined uplink subframe in operation S1030. In this instance, PUCCH format 1b with channel selection may be configured for the terminal.

As another example, when the number $M_{secondary}$ of downlink subframes associated with a single uplink subframe in an SCell is 5 or 6 and PUSCH transmission is indicated in the corresponding uplink subframe, a terminal for which channel selection is configured, may transmit all HARQ-ACKs through a PUSCH without bundling, like the case in which PUCCH format 3 is configured.

A terminal for which PUCCH format 3 is configured, may check how many HARQ-ACK bits are to be transmitted for each serving cell, when transmitting a HARQ-ACK through a PUSCH. The terminal transmits all the HARQ-ACKs through a PUSCH without bundling when the number of bits is not over 20 bits. Therefore, according to exemplary embodiments of the present invention, when PUCCH format 1b with channel selection is configured for a terminal and the number $M_{secondary}$ of associated downlink subframes of the SCell is 5 or 6, all the HARQ-ACKs may be transmitted through a PUSCH without bundling. In this instance, the number of HARQ-ACK bits that are transmitted through a PUCCH and the number of HARQ-ACK bits that are transmitted through a PUSCH may be different. In particular, when PUCCH format 1b with channel selection is configured for a terminal for which TDD-FDD CA is configured, to transmit a PUCCH, and PUSCH transmission is indicated in a single uplink subframe and the number $M_{secondary}$ of downlink subframes associated with the corresponding uplink subframe in the SCell is 5 or 6, if a PDCCH/EPDCCH indicating the corresponding PUSCH transmission is $W_{DAI}^{UL}$=5 or 6, the terminal may generate HARQ-ACK information $O_j^{ACK}$ and transmit the same on the PUSCH, like the case in which PUCCH format 3 is configured. Here, $W_{DAI}^{UL}$ may be indicated based on the following Table 6.

TABLE 6

| DAI MSB, LSB | $W_{DAI}^{UL}$ |
| --- | --- |
| 0, 0 | 1 or 5 |
| 0, 1 | 2 or 6 |
| 1, 0 | 3 |
| 1, 1 | 4 |

Figure 11:
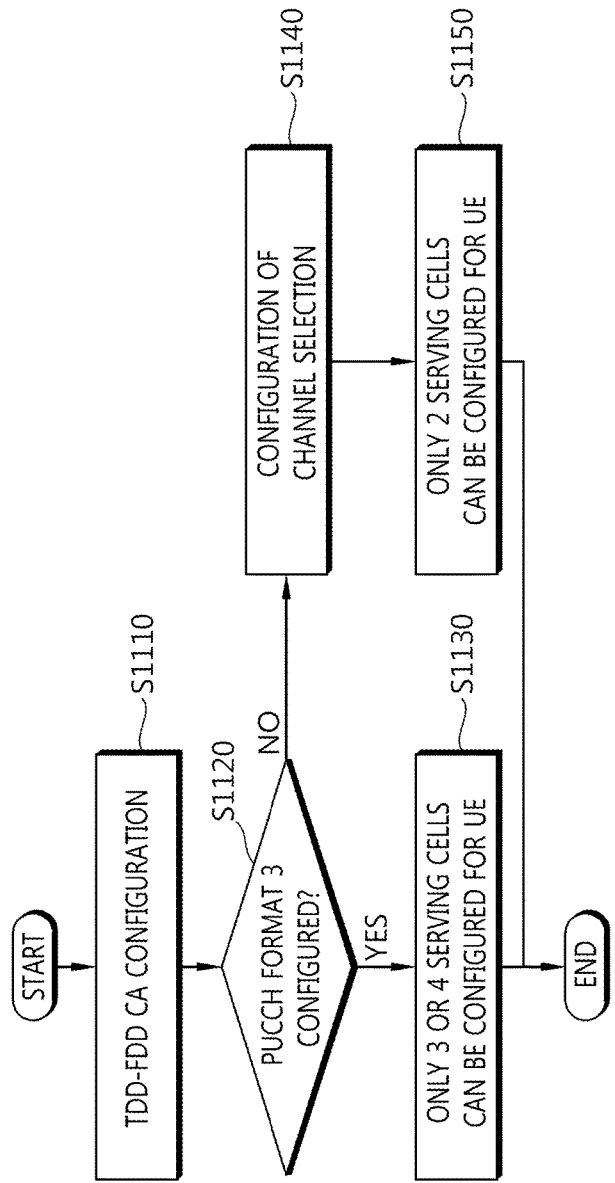
FIG. 11 is a flowchart illustrating a method of configuring serving cells for a terminal when PUCCH format 3 is configured for the terminal that supports TDD-FDD CA, according to an embodiment of the present invention.

FIG. 11 is a flowchart illustrating a method of configuring serving cells for a terminal when PUCCH format 3 is configured for the terminal that supports TDD-FDD CA, according to an embodiment of the present invention.

For the terminal, CA of a maximum of 5 serving cells may be executed. However, PUCCH format 3 and CA configuration requires the following constraints.

1. In TDD, when a terminal supports a plurality of serving cells, at least two of the plurality of serving cells have different UL-DL configurations, and DL reference UL-DL configuration 5 is configured for at least one serving cell, the corresponding terminal may not expect CA of two or more serving cells.

2. In TDD, when a terminal supports a plurality of serving cells, at least two of the plurality of serving cells have different UL-DL configurations, and TDD UL-DL configuration 5 is configured for at least one serving cell, the corresponding terminal may not expect CA of two or more serving cells.

3. When two serving cells are configured for a terminal and the two serving cells have the same UL-DL configuration 5, the corresponding terminal may not support a channel selection-based TDD UL-DL configuration.

4. When two serving cells are configured for a terminal and the two serving cells have different UL-DL configurations 5, the corresponding terminal may not support a channel selection-based UL-DL configuration.

PUCCH format 3 supports a maximum of 21 bits for HARQ-ACK+SR+(or CQI). Spatial bundling may be applied when 20 or more bits are used. However, in a case of TDD-FDD CA (for example, TDD corresponds to a PCell and FDD corresponds to an SCell), when a new DL HARQ timing for the SCell is applied, there may be a case in which the number of associated downlink subframes of the SCell is 6 (that is, M=6). Therefore, when four serving cells (one PCell (TDD)+three SCell (FDD)) are aggregated, a maximum number of HARQ-ACK bits is (4+6+6+6)=22 bits, and PUCCH format 3 may not support the same.

Therefore, as an example, when CA of a PCell having a TDD UL-DL configuration 0, 1, 2, 3, 4, or 6 and FDD (SCell) is configured for a terminal in operation S1110 as illustrated in FIG. 11, and PUCCH format 3 is configured in operation S1120, the CA for the terminal may be limited to the CA of three serving cells in operation S1130. For the rest cases, a total of 5 serving cells may be aggregated for the terminal. Alternatively, for all the terminals for which the TDD-FDD CA is configured, only three serving cells may be always aggregated. Here, a case in which TDD UL-DL configuration 5 exists for a serving cell aggregated for the terminal may be excluded. Alternatively, when CA of PCell (TDD) and SCell (FDD) is configured and the number of associated downlink subframes of the SCell is 5 (that is, M=5). CA of a total of 4 serving cells may be allowed for a terminal for which PUCCH format 3 is configured. For 19-bit HARQ ACK information in association with a PCell (M=4) and three SCells (M=5), CA of the corresponding four serving cells may be configured. Therefore, PUCCH format 3 may be supported within the corresponding range.

As another example, a maximum number of HARQ-ACK bits that may be supported by the capacity of PUCCH format 3 may be extended to 22 bits. In this instance, a maximum of four serving cells may be configured for a terminal for which the TDD-FDD CA and PUCCH format 3 are configured, in operation S1130. Here, a case in which TDD UL-DL configuration 5 exists in a serving cell aggregated for the terminal may be excluded.

The channel selection may be set for a terminal for which the TDD-FDD CA is configured and PUCCH format 3 is not configured, in operation S1140, and only two serving cells may be configured in operation S1150.

Figure 12:
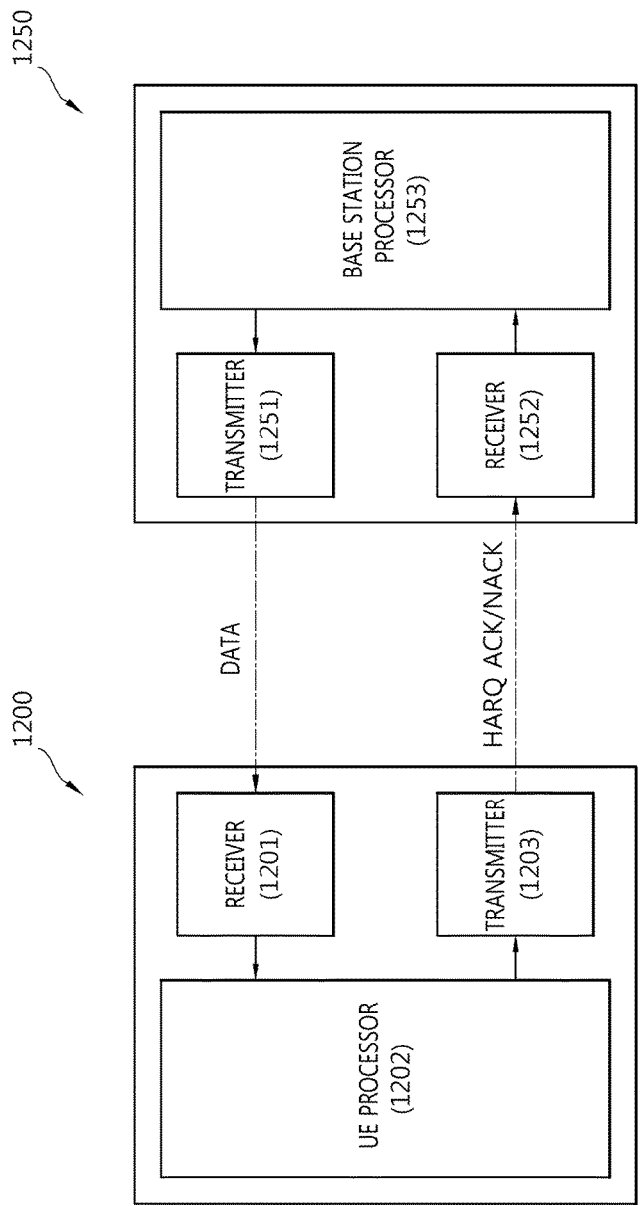
FIG. 12 is a block diagram illustrating a terminal and a base station according to an embodiment of the present invention.

FIG. 12 is a block diagram illustrating a terminal and a base station according to an embodiment of the present invention.

Referring to FIG. 12, a terminal 1200 includes a receiving unit 1201, a terminal processor 1202, and a transmitting unit 1203. The receiving unit 1201 receives data transmitted from a base station 1250 over a PCell or an SCell. Here, the data is referred to as a Transport Block (TB) or a Code Word (CW). The data is received through a PDSCH. Together with the data, a PDCCH or an EPDCCH indicating resources used for transmission of the data may be transmitted. Here, a DCI including a DAI may be mapped to the PDCCH/EPDCCH. A DAI value associated with a new associated subframe may or may not be identical to a DAI value of at least one legacy associated subframe. The PCell may operate based on a TDD scheme, and the SCell may operate based on an FDD scheme.

The receiving unit 1201 may receive the data from the base station 1250 over a plurality of subframes. The plurality of subframes may include a plurality of legacy associated subframes and at least one new associated subframe. For example, the receiving unit 1201 receives a first TB in a first subframe of the SCell, receives a second TB in a second subframe of the SCell, and receives a third TB in a third subframe of the SCell. Here, the plurality of subframes may not need to be consecutive subframes.

The terminal processor 1202 may generate a HARQ-ACK with respect to the data received by the receiving unit 1201. The terminal processor 1202 may execute a MAC layer procedure associated with HARQ. The terminal processor 1202 generates a HARQ-ACK for each of the PCell and the SCell, based on each DAI or based on the number of serving cells or an index of a CW.

In this instance, the number $M_{secondary}$ of associated downlink subframes of an SCell becomes 5 or 6 by a new DL HARQ timing for the SCell as shown in Table 5, the terminal processor 1202 generates four HARQ ACK/NACKs by executing bundling a HARQ ACK/NACK for a new associated subframe and a HARQ ACK/NACK for a legacy associated subframe and thus, may transmit a HARQ ACK/NACK signal by utilizing the existing channel selection mapping table. To this end, the terminal processor 1202 may determine an M value based on a greater value from among a smaller value between the number $M_{secondary}$ of associated downlink subframes of the SCell and a predetermined value (for example, 4), and the number $M_{primary}$ of associated downlink subframes of the PCell. That is, the M value may be determined based on max($M_{primary}$, min ($M_{secondary}$, 4)). When the smaller value between the number $M_{secondary}$ of associated downlink subframes of the SCell and the predetermined value is smaller than the determined M value (that is, min($M_{secondary}$, 4)<M), the terminal processor 1202 may map the state of HARQ-ACK(j) associated with a j value (j=min($M_{secondary}$, 4) to M−1) for the corresponding SCell, as DTX. Subsequently, the terminal processor 1202 may select a channel selection mapping table based on the determined M value, and may map a HARQ-ACK to a predetermined resource index and a modulation symbol, based on the selected channel selection mapping table.

The transmitting unit 1203 transmits the HARQ ACK/NACK generated by the terminal processor 1202 to the base station 1250 using a predetermined uplink subframe and predetermined resource. In this instance, the transmitting unit 1203 may transmit the HARQ ACK/NACK using PUCCH format 1b with channel selection.

As another example, when the number $M_{secondary}$ of associated downlink subframes of the SCell is 5 or 6, the terminal processor 1202 may indicate the transmitting unit 1203 to transmit all HARQ-ACKs through a PUSCH without bundling, like the case in which PUCCH format 3 is configured for the terminal 1200. A terminal for which PUCCH format 3 is configured, checks how many HARQ-ACK bits are needed to be transmitted for each serving cell for transmitting a HARQ-ACK through a PUSCH, and transmit all of the HARQ-ACKs through a PUSCH without bundling when the number of bits is not over 20 bits.

The base station 1250 includes a transmitting unit 1251, a receiving unit 1252, and a base station processor 1253.

The transmitting unit 1251 transmits data to the terminal 1200 over a PCell or an SCell. The data may be transmitted through a PDSCH, and a PDCCH or EPDCCH indicating resources used for transmission of the data may be transmitted together with the data. Here, a DCI including a DAI may be mapped to the PDCCH/EPDCCH. The DCI may be generated by the base station processor 1253. A DAI value associated with a new associated subframe may or may not be identical to a DAI value of at least one legacy associated subframe.

The base station processor 1253 calculates a DAI value having a value accumulated as many times as the number of PDCCHs and/or EPDCCHs indicating PDSCH transmission. In this instance, there is no exception for a DAI of a new associated subframe. The base station processor 1253 may update a DAI value in a DCI format, for each subframe.

The terminal 1200 may support a case in which all of the ten subframes of an SCell are associated with a single uplink subframe (that is, a new DL HARQ timing) and thus, the base station processor 1253 may set a DAI value to indicate a maximum of ten subframes having a PDSCH.

The receiving unit 1252 receives a HARQ ACK/NACK that is transmitted through a predetermined UL subframe and resource. The receiving unit 1252 may receive the HARQ ACK/NACK through PUCCH format 1b with channel selection, or on a PUSCH.

Further, according to exemplary embodiments of the present invention, a UE may establish a Radio Resource Control (RRC) connection with a base station through a first serving cell, which supports a Time Division Duplex (TDD) mode. After establishing the RRC connection, the UE may receive an RRC message through the first serving cell. The RRC message may include carrier aggregation (CA) configuration information and the CA configuration information may include information of a second serving cell supporting a Frequency Division Duplex (FDD) mode. The first serving cell and the second serving cell may be aggregated by a TDD-FDD CA scheme, and the second serving cell may be configured for the UE according to a self-scheduling scheme.

The UE may determine a downlink (DL) reference timing for transmitting an HARQ response signal based on information received through the first serving cell. The HARQ response signal is responsive to a Physical Downlink Shared Channel (PDSCH) received through the second serving cell.

The UE may also receive a Physical Downlink Control Channel (PDCCH) transmission or an Enhanced PDCCH (EPDCCH) transmission through the second serving cell. The UE recognizes, from the PDCCH or the EPDCCH, a 2-bit uplink (UL) downlink assignment index (DAI) field configured in a UL downlink control information (DCI) format. The UL DCI format indicates a Physical Uplink Shared Channel (PUSCH) transmission on the second serving cell, and the 2-bit UL DAI field indicates the number of PDSCHs scheduled in downlink subframes associated with one uplink subframe of the second serving cell. The UE receives the PDSCH transmission through the second serving cell.

The UE may generate an HARQ response signal based on the number of PDSCHs scheduled in the downlink subframes indicated by the UL DAI field and the number of total downlink subframes associated with the one uplink subframe. The HARQ response signal may be generated in association with PUCCH format 3 if the number of total downlink subframes associated with the one uplink subframe is 5 or 6. Then, the UE transmits the HARQ response signal through a PUSCH in the one uplink subframe.

Further, the DL reference timing may be determined based on one of TDD UL/DL configurations 2, 3, and 4 of the first serving cell. The UE may generate HARQ bits for PDSCHs received through the 5 or 6 downlink subframes associated with the one uplink subframe when generating the HARQ signal.

If the TDD UL/DL configuration of the first serving cell is TDD UL/DL configuration 2, an uplink subframe having an index N is associated with 5 downlink subframes having indexes N-4, N-5, N-6, N-7, and N-8. Here, N is at least one of 2 and 7.

If the TDD UL/DL configuration of the first serving cell is TDD UL/DL configuration 3, an uplink subframe having an index N is associated with 6 downlink subframes having indexes N-6, N-7, N-8, N-9, N-10, and N-11. Here, N is 2.

If the TDD UL/DL configuration of the first serving cell is TDD UL/DL configuration 4, an uplink subframe having an index N is associated with 6 downlink subframes having indexes N-7, N-8, N-9, N-10, N-11, and N-12. Here, N is 2.

The UE may retrieve and determine values of most significant bit (MSB) and least significant bit (LSB) of the UL DAI field. The UE may confirm the number of PDSCHs scheduled in the downlink subframes associated with the one uplink subframe, $W_{DAI}^{UL}$, as 5 when the MSB and the LSB are zero, respectively. The UE may confirm the number of scheduled PDSCHs in downlink subframes associated with the one uplink subframe, $W_{DAI}^{UL}$, as 6 when the MSB is zero and the LSB is one.

PUCCH format of the UE is configured by an RRC signaling from the base station. Further, self-scheduling scheme is configured such that the PDCCH and the PDSCH indicated by the PDCCH are transmitted through one downlink component carrier or the EPDCCH and the PDSCH indicated by the EPDCCH are transmitted through one downlink component carrier.

Further, according to exemplary embodiments of the present invention, a base station, e.g., an eNodeB, may establish a Radio Resource Control (RRC) connection with a UE through a first serving cell, which supports a Time Division Duplex (TDD) mode. After establishing the RRC connection, the base station may transmit, to the UE, an RRC message through the first serving cell. The RRC message may include carrier aggregation (CA) configuration information and the CA configuration information may include information of a second serving cell supporting a Frequency Division Duplex (FDD) mode. The first serving cell and the second serving cell may be aggregated by a TDD-FDD CA scheme, and the second serving cell may be configured for the UE according to a self-scheduling scheme.

The base station may transmit, through the first serving cell, information relating to a downlink (DL) reference timing, which enables the UE to transmit an HARQ response signal based on the DL reference timing. The HARQ response signal is received by the base station in response to a Physical Downlink Shared Channel (PDSCH) transmitted through the second serving cell.

The base station may transmit, to the UE, a Physical Downlink Control Channel (PDCCH) transmission or an Enhanced PDCCH (EPDCCH) transmission through the second serving cell. The PDCCH or the EPDCCH includes a 2-bit uplink (UL) downlink assignment index (DAI) field configured in a UL downlink control information (DCI) format. Thus, the UE recognizes, from the PDCCH or the EPDCCH, the 2-bit uplink (UL) downlink assignment index (DAI) field. The UL DCI format indicates a Physical Uplink Shared Channel (PUSCH) transmission on the second serving cell, and the 2-bit UL DAI field indicates the number of PDSCHs scheduled in downlink subframes associated with one uplink subframe of the second serving cell. The base station transmits the PDSCH transmission through the second serving cell.

As described above, the UE may generate an HARQ response signal based on the number of PDSCHs scheduled in the downlink subframes indicated by the UL DAI field and the number of total downlink subframes associated with the one uplink subframe. The base station receives the HARQ response signal through a PUSCH in the one uplink subframe. The HARQ response signal may be generated in association with PUCCH format 3 if the number of total downlink subframes associated with the one uplink subframe is 5 or 6. The base station may recognize such a configuration based on the configuration of the number of total downlink subframes associated with the one uplink subframe.

Further, the DL reference timing may be determined based on one of TDD UL/DL configurations 2, 3, and 4 of the first serving cell. The UE may generate HARQ bits for PDSCHs received through the 5 or 6 downlink subframes associated with the one uplink subframe when generating the HARQ signal. The base station decodes the HARQ bits for PDSCHs received through the 5 or 6 downlink subframes associated with the one uplink subframe based on various control information described above.

If the TDD UL/DL configuration of the first serving cell is TDD UL/DL configuration 2, an uplink subframe having an index N is associated with 5 downlink subframes having indexes N-4, N-5, N-6, N-7, and N-8. Here, N is at least one of 2 and 7.

If the TDD UL/DL configuration of the first serving cell is TDD UL/DL configuration 3, an uplink subframe having an index N is associated with 6 downlink subframes having indexes N-6. N-7, N-8, N-9, N-10, and N-11. Here, N is 2.

If the TDD UL/DL configuration of the first serving cell is TDD UL/DL configuration 4, an uplink subframe having an index N is associated with 6 downlink subframes having indexes N-7, N-8, N-9, N-10, N-11, and N-12. Here, N is 2.

The base station may determine values of most significant bit (MSB) and least significant bit (LSB) of the UL DAI field. The base station may indicate that the number of PDSCHs scheduled in the downlink subframes associated with the one uplink subframe, $W_{DAI}^{UL}$, is 5 by setting the MSB and the LSB as zero, respectively. The base station may indicate that the number of scheduled PDSCHs in downlink subframes associated with the one uplink subframe, $W_{DAI}^{UL}$ is 6 by setting the MSB as zero and the LSB as one.

PUCCH format of the UE is configured by an RRC signaling from the base station. Further, when self-scheduling scheme is configured, the PDCCH and the PDSCH indicated by the PDCCH are transmitted through one downlink component carrier or the EPDCCH and the PDSCH indicated by the EPDCCH are transmitted through one downlink component carrier.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

What is claimed is:

1. A method of transmitting a Hybrid Automatic Repeat reQuest (HARQ) response in a wireless, communication system, the method comprising:
    establishing a Radio Resource Control (RRC) connection with a base station through a first serving cell, the first serving cell supporting a Time Division Duplex (TDD) mode;
    receiving, at a user equipment (UE), an RRC message through the first serving cell, the RRC message comprising carrier aggregation (CA) configuration information, the CA configuration information comprising information of a second serving cell supporting a Frequency Division Duplex (FDD) mode, the first serving, cell and the second serving cell being aggregated by a TDD-FDD CA scheme, and the second serving cell being configured for the UE according to a self-scheduling scheme;
    detecting, at the UE, a Physical Downlink Control Channel (PDCCH) transmission or an Enhanced PDCCH (EPDCCH) transmission through the second serving cell;
    recognizing, from the PDCCH or the EPDCCH, a Downlink Assignment Index (DAI) field including a value for all Physical Downlink Shared Channels (PDSCHs) transmission scheduled in downlink subframes associated with one uplink subframe of the second serving cell;
    receiving, at the UE, a PDSCH transmission through the second serving cell;
    generating an HARQ response signal based on the number of PDSCHs scheduled in the downlink subframes indicated by the DAI field and the number of total downlink subframes associated with the one uplink subframe, the HARQ response signal being generated in association with PUCCH format 3 if the value is 5 or 6; and
    transmitting the HARQ response signal through a PUSCH in the one uplink subframe.

2. The method of claim 1, wherein the generating of the HARQ response signal comprises: generating HARQ bits for PDSCHs received through the 5 or 6 downlink subframes associated with the one uplink subframe.

3. The method of claim 1, wherein the DL reference timing is determined based on one of TDD UL/DL configurations 2, 3, and 4 of the first serving cell.

4. The method of claim 3, wherein, if the TDD UL/DL configuration of the first serving cell is TDD UL/DL configuration 2, an uplink subframe having an index N is associated with 5 downlink subframes having indexes N-4, N-5, N-6, N-7, and N-8, and wherein N is at least one of 2 and 7.

5. The method of claim 3, wherein, if the TDD UL/DL configuration of the first serving cell is TDD UL/DL configuration 3, an uplink subframe having an index N is associated with 6 downlink subframes having indexes N-6, N-7, N-8, N-9, N-10, and N-11, and wherein N is 2.

6. The method of claim 3, wherein, if the TDD UL/DL configuration of the first serving cell is TDD UL/DL configuration 4, an uplink subframe having an index N is associated with 6 downlink subframes having indexes N-7, N-8, N-9, N-10, N-11, and N-12, and wherein N is 2.

7. The method of claim 1, further comprising:
retrieving values of most significant bit (MSB) and least significant bit (LSB) of the DAI field;
confirming the number of PDSCHs scheduled in the downlink subframes associated with the one uplink subframe $W_{DAI}^{UL}$, as 5 when the MSB and the LSB are zero, respectively; and
confirming the number of scheduled PDSCHs in downlink subframes associated with the one uplink subframe, $W_{DAI}^{UL}$, as 6 when the MSB is zero and the LSB is one.

8. A method of receiving a Hybrid Automatic Repeat reQuest (HARQ) response in a wireless communication system, the method comprising:
establishing a Radio Resource Control (RRC) connection with, a user equipment (UE) through a first serving cell, the first serving cell supporting a Time Division Duplex (TDD) mode;
transmitting, to the user equipment (UE), an RRC message through the first serving cell, the RRC message comprising carrier aggregation (CA) configuration information, the CA configuration information comprising information of a second serving cell supporting a Frequency Division Duplex (FDD) mode, the first serving cell and the second serving cell being aggregated by a TDD-FDD CA scheme, and the second serving cell being configured for the UE according to a self-scheduling scheme;
transmitting, through the first serving cell, information relating to a downlink (DL) reference timing, which enables the UE to transmit an HARQ response signal based on the DL reference timing, the HARQ response signal being responsive to a Physical Downlink Shared Channel (PDSCH) transmission through the second serving cell;
transmitting, to the UE, a Physical Downlink Control Channel (PDCCH) transmission or an Enhanced PDCCH (EPDCCH) transmission through the second serving cell, the PDCCH or the EPDCCH transmitting a downlink assignment index (DAI) field including a value for all Physical Downlink Shared Channels (PDSCHs) transmission scheduled in downlink subframes associated with one uplink subframe of the second serving cell;
transmitting, to the UE, the PDSCH through the second serving cell;
receiving an HARQ response signal through a PUSCH in the one uplink subframe, the HARQ response signal being configured based on the number of PDSCHs scheduled in the downlink subframes indicated by the DAI field and the number of total downlink subframes associated with the one uplink subframe, the HARQ response signal being configured in association with PUCCH format 3 if the value is 5 or 6.

9. The method of claim 8, further comprising:
determining values of most significant bit (MSB) and least significant bit (LSB) of the DAI field,
wherein the number of PDSCHs scheduled in the downlink subframes associated with the one uplink subframe $W_{DAI}^{UL}$, as 5 when the MSB and the LSB are zero, respectively, and
wherein the number of scheduled PDSCHs in downlink subframes associated with the one uplink subframe, $W_{DAI}^{UL}$, as 6 when the MSB is zero and the LSB is one.

10. A User Equipment (UE) transmitting a Hybrid Automatic Repeat reQuest (HARQ) response in a wireless communication system, the UE comprising:
a receiving unit configured to
receive an Radio Resource Control (RRC) message from a base station through a first serving cell supporting a Time Division Duplex (TDD) mode, the RRC message comprising carrier aggregation (CA) configuration information, the CA configuration information comprising information of a second serving cell supporting a Frequency Division Duplex (FDD) mode, and the first serving cell and the second serving cell being aggregated by a FDD-TDD CA scheme;
detect a Physical Downlink Control Channel (PDCCH) transmission or an Enhanced PDCCH (EPDCCH) transmission through the second serving cell; and
receive a Physical Downlink Shared Channels (PDSCHs) transmission through the second serving cell;
a processor operationally coupled to the receiving unit and configured to:
recognize, from the PDCCH or the EPDCCH, a Downlink Assignment Index (DAI) including a value for all PDSCHs scheduled in downlink subframes associated with one uplink subframe of the second serving cell; and
generate an HARQ response signal based on the number of PDSCHs scheduled in the downlink subframes indicated by the DAI field and the number of total downlink subframes associated with the one uplink subframe, the HARQ response signal being generated in association with PUCCH format 3 if the value is 5 or 6;
a transmitting unit configured to transmit the HARQ response signal through a PUSCH in the one uplink subframe.

11. The UE of claim 10, the processor further configured to:
retrieve values of most significant bit (MSB) and least significant bit (LSB) of the DAI field;
confirm the number of PDSCHs scheduled in the downlink subframes associated with the one uplink subframe $W_{DAI}^{UL}$, as 5 when the MSB and the LSB are zero, respectively; and
confirm the number of scheduled PDSCHs in downlink subframes associated with the one uplink subframe, $W_{DAI}^{UL}$, as 6 when the MSB is zero and the LSB is one.

* * * * *